US011893956B2

(12) United States Patent
Lee et al.

(10) Patent No.: US 11,893,956 B2
(45) Date of Patent: Feb. 6, 2024

(54) ELECTRONIC DEVICE COMPRISING DISPLAY AND OPERATION METHOD THEREOF

(71) Applicant: SAMSUNG ELECTRONICS CO., LTD., Suwon-si (KR)

(72) Inventors: Gwanghui Lee, Suwon-si (KR); Minwoo Lee, Suwon-si (KR); Seungjin Kim, Suwon-si (KR); Woojun Jung, Suwon-si (KR); Kwonsoo Kim, Suwon-si (KR); Kimyung Lee, Suwon-si (KR); Minwoo Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/100,069

(22) Filed: Jan. 23, 2023

(65) Prior Publication Data

US 2023/0154431 A1    May 18, 2023

Related U.S. Application Data

(63) Continuation of application No. PCT/KR2021/010221, filed on Aug. 4, 2021.

(30) Foreign Application Priority Data

Aug. 4, 2020 (KR) .................. 10-2020-0097367

(51) Int. Cl.
*G09G 5/00* (2006.01)
*G06F 3/041* (2006.01)

(52) U.S. Cl.
CPC ........... *G09G 5/001* (2013.01); *G06F 3/0416* (2013.01); *G09G 5/003* (2013.01); *G09G 2310/0245* (2013.01)

(58) Field of Classification Search
CPC .................. G06F 3/041; G06F 3/0416; G09G 2310/0245; G09G 5/001
(Continued)

(56) References Cited

U.S. PATENT DOCUMENTS 7,528,822 B2    5/2009 Amundson et al.
7,532,388 B2    5/2009 Whitesides et al.
(Continued)

FOREIGN PATENT DOCUMENTS

CN    108628562 A    10/2018
CN    111324235 A    6/2020
(Continued)

OTHER PUBLICATIONS

International Search Report (PCT/ISA/210) dated Nov. 23, 2021 by the International Searching Authority in International Application No. PCT/KR2021/010221.
(Continued)

*Primary Examiner* — Calvin C Ma
(74) *Attorney, Agent, or Firm* — Sughrue Mion, PLLC

(57) ABSTRACT

An electronic device includes a display including a plurality of pixels; a display driver configured to provide a data voltage to the plurality of pixels of the display; and a processor configured to: obtain frequency change-based event information, determine a first frequency and a second frequency higher than the first frequency based on the frequency change-based event information, the first frequency being a target value of a refresh frequency, and provide frame data to the display driver, wherein the processor is further configured to control the display driver to: set a frame section in which the display is driven, during a first frame, generate the data voltage based on the frame data and provide the data voltage to the plurality of pixels, and during a low-frequency driving section, in which the frame
(Continued)

data is not obtained, after the first frame, refresh an image based on the second frequency and refresh the image based on the first frequency.

20 Claims, 12 Drawing Sheets

(58) Field of Classification Search
USPC .......................................................... 345/212
See application file for complete search history.

(56) References Cited

U.S. PATENT DOCUMENTS

| | | | |
|---|---|---|---|
| 8,289,250 B2 | 10/2012 | Zehner et al. | |
| 8,305,341 B2 | 11/2012 | Arango et al. | |
| 9,613,585 B2 | 4/2017 | Tanaka et al. | |
| 9,905,199 B2 | 2/2018 | Liu et al. | |
| 10,019,968 B2 | 7/2018 | Bi et al. | |
| 10,032,430 B2 | 7/2018 | Huang et al. | |
| 10,133,403 B2 | 11/2018 | Yeh et al. | |
| 10,248,257 B2 | 4/2019 | Yeh et al. | |
| 10,380,961 B2 | 8/2019 | Sato et al. | |
| 10,607,548 B2 | 3/2020 | Lee | |
| 10,680,586 B2 | 6/2020 | Jun et al. | |
| 11,227,555 B2 | 1/2022 | Park et al. | |
| 11,721,261 B2 * | 8/2023 | Liu .......................... | G06F 3/044 345/174 |
| 11,721,302 B2 * | 8/2023 | Lin .......................... | G09G 5/006 345/428 |
| 2014/0368484 A1 | 12/2014 | Tanaka et al. | |
| 2016/0078846 A1 | 3/2016 | Liu et al. | |
| 2016/0155423 A1 | 6/2016 | Shin | |
| 2017/0193971 A1 | 7/2017 | Bi et al. | |
| 2017/0263201 A1 | 9/2017 | Sato et al. | |
| 2018/0004340 A1 | 1/2018 | Yeh et al. | |
| 2019/0034026 A1 | 1/2019 | Yeh et al. | |
| 2019/0051250 A1 | 2/2019 | Lee | |

FOREIGN PATENT DOCUMENTS

| | | |
|---|---|---|
| JP | 2000-293128 A | 10/2000 |
| JP | 2010-517115 A | 5/2010 |
| JP | 2013-213912 A | 10/2013 |
| JP | 5885760 B2 | 2/2016 |
| KR | 10-2016-0064839 A | 6/2016 |
| KR | 10-2016-0081424 A | 7/2016 |
| KR | 10-2018-0003736 A | 1/2018 |
| KR | 10-2018-0112073 A | 10/2018 |
| KR | 10-2019-0016634 A | 2/2019 |
| KR | 10-2019-0067053 A | 6/2019 |
| KR | 10-2021-0130894 A | 11/2021 |

OTHER PUBLICATIONS

Written Opinion (PCT/ISA/237) dated Nov. 23, 2021 by the International Searching Authority in International Application No. PCT/KR2021/010221.

* cited by examiner

ELECTRONIC DEVICE COMPRISING DISPLAY AND OPERATION METHOD THEREOF

CROSS-REFERENCE TO RELATED APPLICATIONS

This application is a bypass continuation of International Application No. PCT/KR2021/010221, filed on Aug. 4, 2021, which is based on and claims priority to Korean Patent Application No. 10-2020-0097367 filed on Aug. 4, 2020, in the Korean Intellectual Property Office, the disclosures of which are incorporated by reference herein in their entireties.

BACKGROUND

1. Field

The disclosure relates to an electronic device including a display and an operating method thereof.

2. Description of Related Art

An electronic device may display an image through a display disposed on a surface of housing. A plurality of pixels for displaying the image may be positioned on the display. The display may receive signals and voltages for displaying the image from a display driver IC (DDI). Each of the plurality of pixels may receive a data voltage corresponding to brightness and color of the image to be displayed during a frame from the DDI. A driving transistor of a pixel may be driven by the data voltage supplied during a frame, and thus a light emitting device such as an organic light emitting diode (OLED) may emit light with specified brightness.

In a display including an oxide semiconductor-based oxide thin film transistor, a refresh frequency may be reduced depending on features of an oxide semiconductor where the refresh indicates an operation of displaying an image by inputting a data voltage to a pixel.

SUMMARY

Provided is an electronic device that may current consumption used for the refresh by reducing the refresh frequency of a display.

In addition, provided is an electronic device that may prevent a color difference or a brightness difference according to a change in the refresh frequency from being visually perceived.

In addition, provided is an electronic device that may not cause abnormal phenomena (e.g., ghost touch) due to interference with components of the electronic device when the refresh frequency is changed.

According to an aspect of the disclosure, an electronic device may include: a display including a plurality of pixels; a display driver configured to provide a data voltage to the plurality of pixels of the display; and a processor configured to: obtain frequency change-based event information, determine a first frequency and a second frequency higher than the first frequency based on the frequency change-based event information, the first frequency being a target value of a refresh frequency, and provide frame data to the display driver, wherein the processor is further configured to control the display driver to: set a frame section in which the display is driven, during a first frame, generate the data voltage based on the frame data and provide the data voltage to the plurality of pixels, and during a low-frequency driving section, in which the frame data is not obtained, after the first frame, refresh an image based on the second frequency and refresh the image based on the first frequency.

The processor may be further configured to control the display driver to: set at least one frame of a first section within the low-frequency driving section as a self-refresh frame based on the second frequency, set at least one frame of a second section after the first section as the self-refresh frame based on the first frequency, and provide the data voltage to the plurality of pixels during the self-refresh frame.

The processor may be further configured to control the display driver to maintain the data voltage, which is input during the self-refresh frame or the first frame, during frames other than the self-refresh frame of each of the first section and the second section.

The processor may be further configured to: determine a third frequency, which is the refresh frequency of a third section between the first section and the second section, based on the frequency change-based event information, and control the display driver to set at least one frame within the third section as the self-refresh frame based on the third frequency.

The frequency change-based event information may include illuminance information, and the processor may be further configured to set a length of the third section to increase as an illuminance value decreases.

The frequency change-based event information may include illuminance information, and the processor may be further configured to set at least one of the first frequency or the second frequency to decrease as an illuminance value increases.

The frequency change-based event information may include touch information, and the processor may be further configured to: set a limit frequency based on an event that a user is performing a touch operation, and set the first frequency to a value of the limit frequency or higher.

The frequency change-based event information may include wireless charging information, and the processor may be further configured to: set a limit frequency based on an event that wireless charging is in progress, and set the first frequency to a value of the limit frequency or higher.

The frequency change-based event information may include always-on-display (AOD) information, and the processor may be further configured to: set a limit frequency based on entering an AOD mode, and set the first frequency to a value of the limit frequency or higher.

The frequency change-based event information may include image information, and the processor may be further configured to: set a minimum value, which the first frequency is capable of having, to a limit frequency, compare an image update frequency with the limit frequency based on an event that an image is updated at an identical period, and based on the image update frequency being greater than the limit frequency, set the second frequency to a value identical to the image update frequency.

The processor may be further configured to, based on the image update frequency being not greater than the limit frequency, set the second frequency to a value identical to the limit frequency.

According to an aspect of the disclosure, an operating method of an electronic device, includes: determining a first frequency and a second frequency higher than the first frequency based on frequency change-based event information, the first frequency being a target value of a refresh frequency; setting a frame section in which a display is driven; during a first frame, generating, by a display driver of the electronic device, a data voltage based on frame data and providing, by the display driver, the data voltage to a plurality of pixels in the display; and during a low-frequency driving section, in which the frame data is not obtained by the display driver, after the first frame, refreshing an image based on the second frequency and refreshing the image based on the first frequency.

The operating method may further include: setting at least one frame of a first section within the low-frequency driving section as a self-refresh frame based on the second frequency; setting at least one frame of a second section after the first section as the self-refresh frame based on the first frequency; and providing the data voltage to the plurality of pixels during the self-refresh frame.

The operating method may further include maintaining the data voltage, which is input during the self-refresh frame or the first frame, during frames other than the self-refresh frame of each of the first section and the second section.

The operating method may further include: determining a third frequency, which is the refresh frequency of a third section between the first section and the second section, based on the frequency change-based event information, and setting at least one frame within the third section as the self-refresh frame based on the third frequency.

The operating method may further include setting at least one of the first frequency or the second frequency to decrease as an illuminance value increases.

The operating method may further include: setting a limit frequency based on an event that a user is performing a touch operation, and setting the first frequency to a value of the limit frequency or higher.

The operating method may further include: setting a limit frequency based on an event that wireless charging is in progress; and setting the first frequency to a value of the limit frequency or higher.

The operating method may further include: setting a limit frequency based on entering an always-on display (AOD) mode; and setting the first frequency to a value of the limit frequency or higher.

The operating method may further include: setting a minimum value, which the first frequency is capable of having, to a limit frequency; comparing an image update frequency with the limit frequency based on an event that an image is updated at an identical period; and based on the image update frequency being higher than the limit frequency, setting the second frequency to a value identical to the image update frequency.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Hereinafter, various embodiments of the disclosure are described with reference to the accompanying drawings. However, it is not intended to limit the disclosure to specific embodiments, and it should be understood that various modifications, equivalents, and/or alternatives of embodiments of the disclosure are included. With regard to the drawings, the same or similar components may be labeled by the same or similar reference signs/numbers.

Figure 1:
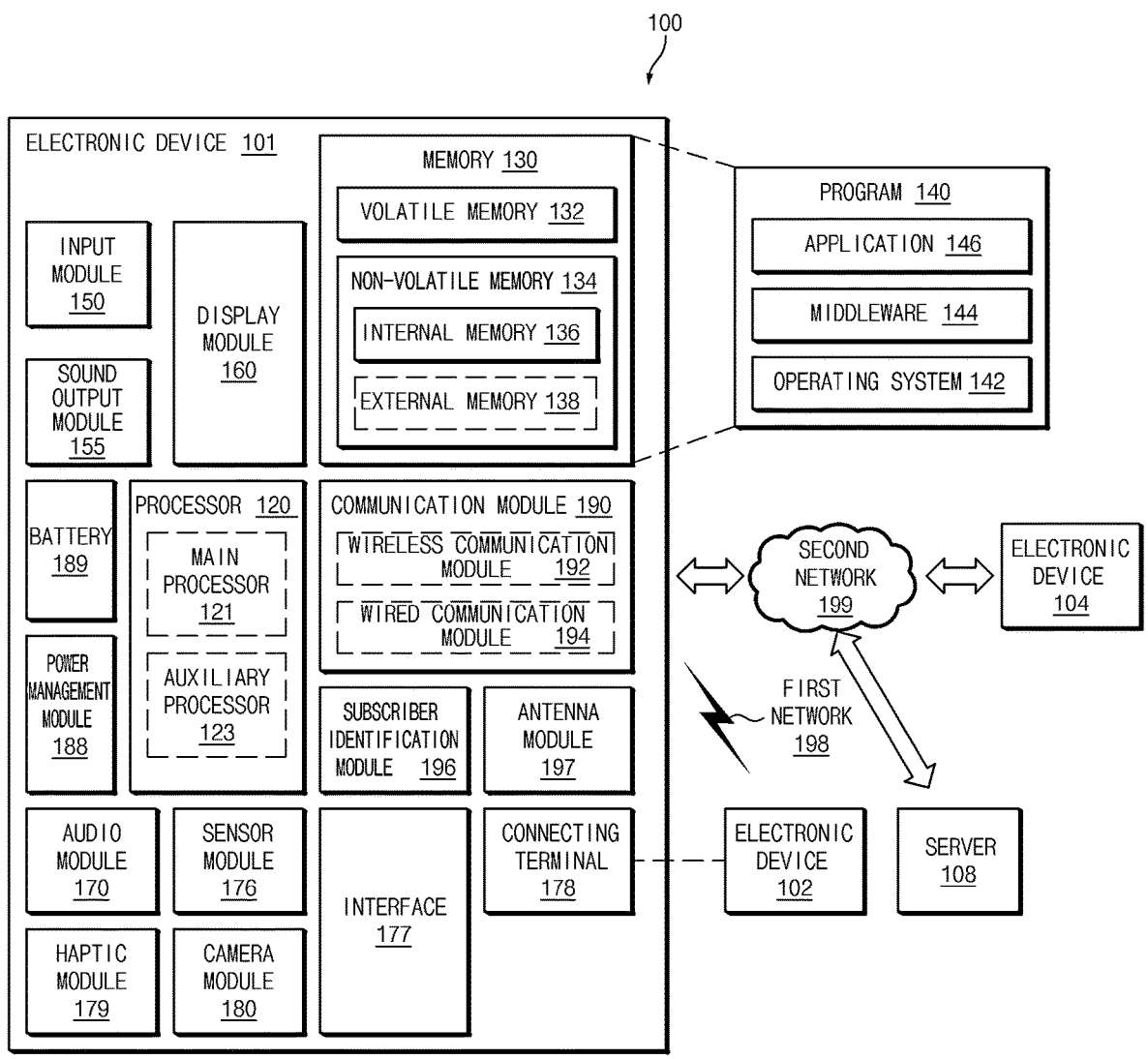
FIG. 1 is a block diagram of an electronic device in a network environment, according to various embodiments.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the display module 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display module 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

The connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via the user's tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
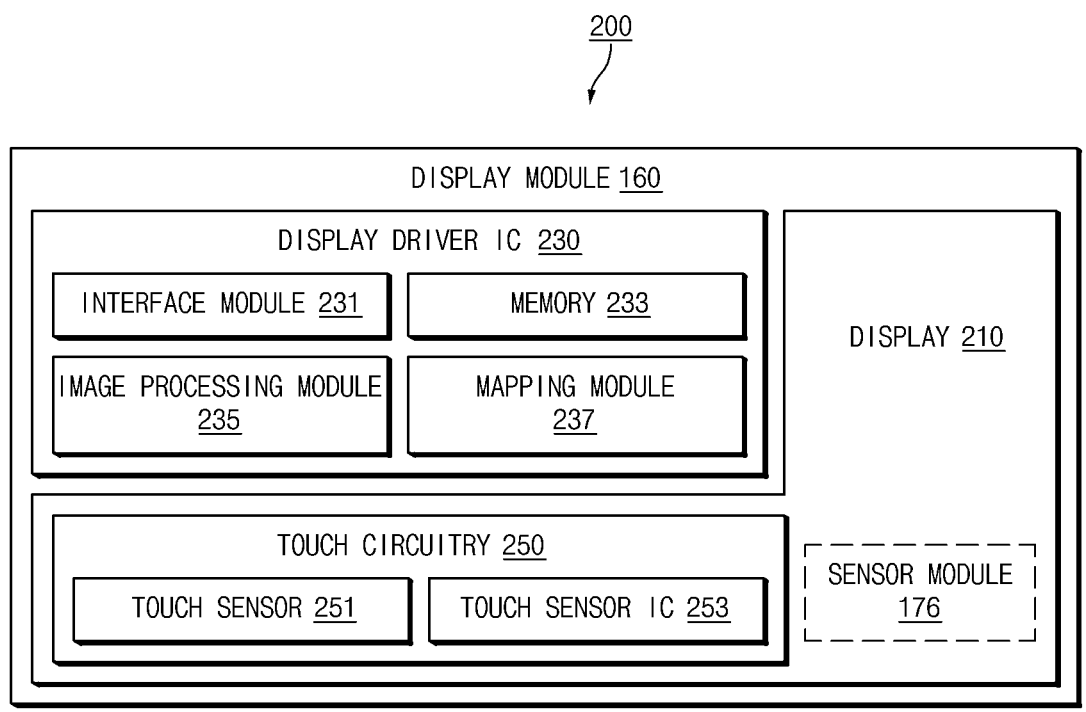
FIG. 2 is a block diagram of a display device, according to various embodiments.

FIG. 2 is a block diagram 200 illustrating the display module 160 according to various embodiments.

Referring to FIG. 2, the display module 160 may include a display 210 and a display driver integrated circuit (DDI) 230 to control the display 210. The DDI 230 may be referred to as a display driver and may include an interface module 231, a memory 233 (e.g., buffer memory), an image processing module 235, or a mapping module 237. The DDI 230 may receive image information that contains image data or an image control signal corresponding to a command to control the image data from another component of the electronic device 101 via the interface module 231. For example, according to an embodiment, the image information may be received from the processor 120 (e.g., the main processor 121 (e.g., an application processor)) or the auxiliary processor 123 (e.g., a graphics processing unit) operated independently from the function of the main processor 121. The DDI 230 may communicate, for example, with touch circuitry 150 or the sensor module 176 via the interface module 231. The DDI 230 may also store at least part of the received image information in the memory 233, for example, on a frame by frame basis.

The image processing module 235 may perform pre-processing or post-processing (e.g., adjustment of resolution, brightness, or size) with respect to at least part of the image data. According to an embodiment, the pre-processing or post-processing may be performed, for example, based at least in part on one or more characteristics of the image data or one or more characteristics of the display 210.

The mapping module 237 may generate a voltage value or a current value corresponding to the image data pre-processed or post-processed by the image processing module 235. According to an embodiment, the generating of the voltage value or current value may be performed, for example, based at least in part on one or more attributes of the pixels (e.g., an array, such as an RGB stripe or a pentile structure, of the pixels, or the size of each subpixel). At least some pixels of the display 210 may be driven, for example, based at least in part on the voltage value or the current value such that visual information (e.g., a text, an image, or an icon) corresponding to the image data may be displayed via the display 210.

According to an embodiment, the display module 160 may further include the touch circuitry 250. The touch circuitry 250 may include a touch sensor 251 and a touch sensor IC 253 to control the touch sensor 251. The touch sensor IC 253 may control the touch sensor 251 to sense a touch input or a hovering input with respect to a certain position on the display 210. To achieve this, for example, the touch sensor 251 may detect (e.g., measure) a change in a signal (e.g., a voltage, a quantity of light, a resistance, or a quantity of one or more electric charges) corresponding to the certain position on the display 210. The touch circuitry 250 may provide input information (e.g., a position, an area, a pressure, or a time) indicative of the touch input or the hovering input detected via the touch sensor 251 to the processor 120. According to an embodiment, at least part (e.g., the touch sensor IC 253) of the touch circuitry 250 may be formed as part of the display 210 or the DDI 230, or as part of another component (e.g., the auxiliary processor 123) disposed outside the display module 160.

According to an embodiment, the display module 160 may further include at least one sensor (e.g., a fingerprint sensor, an iris sensor, a pressure sensor, or an illuminance sensor) of the sensor module 176 or a control circuit for the at least one sensor. In such a case, the at least one sensor or the control circuit for the at least one sensor may be embedded in one portion of a component (e.g., the display 210, the DDI 230, or the touch circuitry 150)) of the display module 160. For example, when the sensor module 176 embedded in the display module 160 includes a biometric sensor (e.g., a fingerprint sensor), the biometric sensor may obtain biometric information (e.g., a fingerprint image) corresponding to a touch input received via a portion of the display 210. As another example, when the sensor module 176 embedded in the display module 160 includes a pressure sensor, the pressure sensor may obtain pressure information corresponding to a touch input received via a partial or whole area of the display 210. According to an embodiment, the touch sensor 251 or the sensor module 176 may be disposed between pixels in a pixel layer of the display 210, or over or under the pixel layer.

Figure 3:
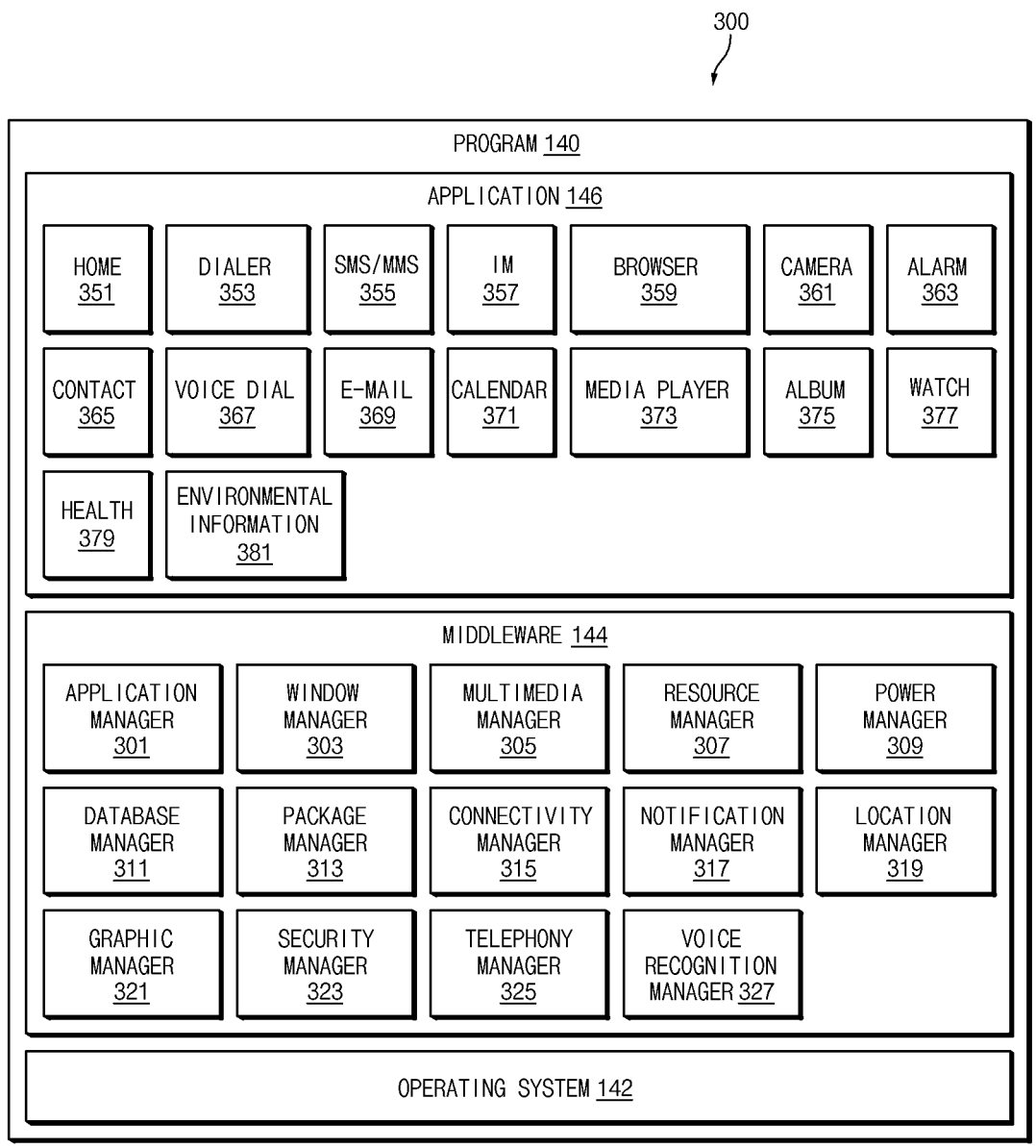
FIG. 3 is a block diagram of a program according to various embodiments.

FIG. 3 is a block diagram 300 illustrating the program 140 according to various embodiments. According to an embodiment, the program 140 may include an operating system (OS) 142 to control one or more resources of the electronic device 101, middleware 144, or an application 146 executable in the OS 142. The OS 142 may include, for example, Android™, iOS™, Windows™, Symbian™, Tizen™, or Bala™. At least part of the program 140, for example, may be pre-loaded on the electronic device 101 during manufacture, or may be downloaded from or updated by an external electronic device (e.g., the electronic device 102 or 104, or the server 108) during use by a user.

The OS 142 may control management (e.g., allocating or deallocation) of one or more system resources (e.g., process, memory, or power source) of the electronic device 101. The OS 142, additionally or alternatively, may include one or more driver programs to drive other hardware devices of the electronic device 101, for example, the input device 150, the sound output device 155, the display module 160, the audio module 170, the sensor module 176, the interface 177, the haptic module 179, the camera module 180, the power management module 188, the battery 189, the communication module 190, the subscriber identification module 196, or the antenna module 197.

The middleware 144 may provide various functions to the application 146 such that a function or information provided from one or more resources of the electronic device 101 may be used by the application 146. The middleware 144 may include, for example, an application manager 301, a window manager 303, a multimedia manager 305, a resource manager 307, a power manager 309, a database manager 311, a package manager 313, a connectivity manager 315, a notification manager 317, a location manager 319, a graphic manager 321, a security manager 323, a telephony manager 325, or a voice recognition manager 327.

The application manager 301, for example, may manage the life cycle of the application 146. The window manager 303, for example, may manage one or more graphical user interface (GUI) resources that are used on a screen. The multimedia manager 305, for example, may identify one or more formats to be used to play media files, and may encode or decode a corresponding one of the media files using a codec appropriate for a corresponding format selected from the one or more formats. The resource manager 307, for example, may manage the source code of the application 146 or a memory space of the memory 130. The power manager 309, for example, may manage the capacity, temperature, or power of the battery 189, and determine or provide related information to be used for the operation of the electronic device 101 based at least in part on corresponding information of the capacity, temperature, or power of the battery 189. According to an embodiment, the power manager 309 may interwork with a basic input/output system (BIOS) of the electronic device 101.

The database manager 311, for example, may generate, search, or change a database to be used by the application 146. The package manager 313, for example, may manage installation or update of an application that is distributed in the form of a package file. The connectivity manager 315, for example, may manage a wireless connection or a direct connection between the electronic device 101 and the external electronic device. The notification manager 317, for example, may provide a function to notify a user of an occurrence of a specified event (e.g., an incoming call, message, or alert). The location manager 319, for example, may manage locational information on the electronic device 101. The graphic manager 321, for example, may manage one or more graphic effects to be offered to a user or a user interface related to the one or more graphic effects.

The security manager 323, for example, may provide system security or user authentication. The telephony manager 325, for example, may manage a voice call function or a video call function provided by the electronic device 101. The voice recognition manager 327, for example, may transmit a user's voice data to the server 108, and receive, from the server 108, a command corresponding to a function to be executed on the electronic device 101 based at least in part on the voice data, or text data converted based at least in part on the voice data. According to an embodiment, the middleware 344 may dynamically delete some existing components or add new components. According to an embodiment, at least part of the middleware 144 may be included as part of the OS 142 or may be implemented as another software separate from the OS 142.

The application 146 may include, for example, a home 351, dialer 353, short message service (SMS)/multimedia messaging service (MMS) 355, instant message (IM) 357, browser 359, camera 361, alarm 363, contact 365, voice recognition 367, email 369, calendar 371, media player 373, album 375, watch 377, health 379 (e.g., for measuring the degree of workout or biometric information, such as blood sugar), or environmental information 381 (e.g., for measuring air pressure, humidity, or temperature information) application. According to an embodiment, the application 146 may further include an information exchanging application that is capable of supporting information exchange between the electronic device 101 and the external electronic device. The information exchange application, for example, may include a notification relay application adapted to transfer designated information (e.g., a call, message, or alert) to the external electronic device or a device management application adapted to manage the external electronic device. The notification relay application may transfer notification information corresponding to an occurrence of a specified event (e.g., receipt of an email) at another application (e.g., the email application 369) of the electronic device 101 to the external electronic device. Additionally or alternatively, the notification relay application may receive notification information from the external electronic device and provide the notification information to a user of the electronic device 101.

The device management application may control the power (e.g., turn-on or turn-off) or the function (e.g., adjustment of brightness, resolution, or focus) of the external electronic device or some component thereof (e.g., a display device or a camera module of the external electronic device). The device management application, additionally or alternatively, may support installation, delete, or update of an application running on the external electronic device.

Figure 4:
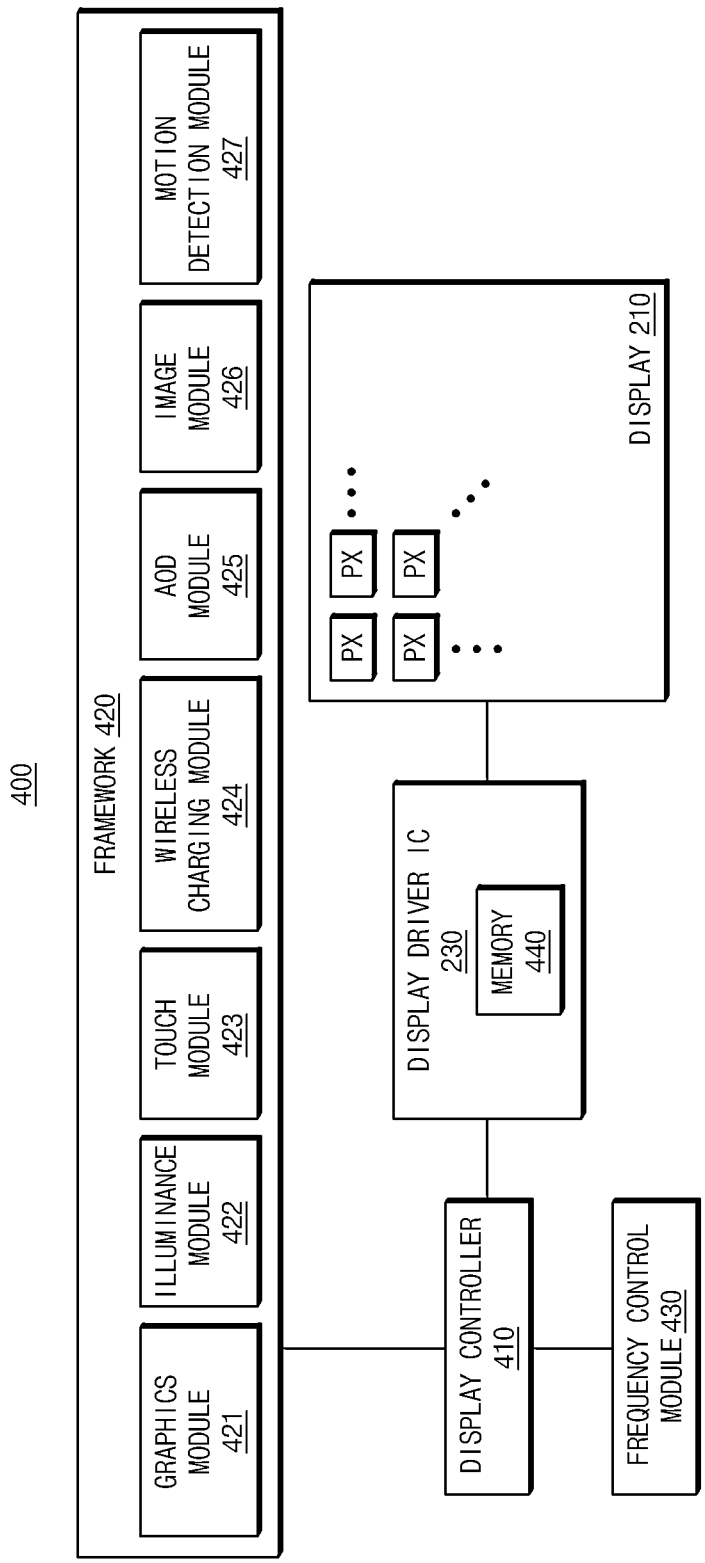
FIG. 4 is a block diagram illustrating an electronic device according to an embodiment.

Hereinafter, an electronic device 400 according to an embodiment will be described with reference to FIG. 4. FIG. 4 is a block diagram illustrating an electronic device 400, according to an embodiment.

Referring to FIG. 4, the electronic device 400 according to an embodiment may include the display 210, the display driver IC 230, a display controller 410, a framework 420, and a frequency control module 430. Components (e.g., the display device IC 230, the display controller 410, the framework 420, and the frequency control module 430) included in the electronic device 400 according to an embodiment may be controlled by a processor (e.g., the processor 120 in FIG. 1) of the electronic device 400. In addition, the operations of the components (e.g., the display device IC 230, the display controller 410, the framework 420, and the frequency control module 430) in the electronic device 400 may be performed by the processor (e.g., the processor 120 in FIG. 1) of the electronic device 400.

The display 210 may include a plurality of data lines for transmitting data voltages, a plurality of gate lines for transmitting gate signals, and a plurality of pixels PX connected to the plurality of data lines and the plurality of gate lines. Each of the pixels PX may include a first transistor (e.g., a driving transistor) and a second transistor (e.g., a switching transistor). Each of the pixels PX may include at least one oxide thin film transistor based on an oxide semiconductor. Each of the pixels PX may indicate a grayscale corresponding to an input data voltage. The display 210 may display an image in units of frame based on an operating frequency of the display 210.

The display driver IC 230 may obtain frame data and a control command from the display controller 410. The display driver IC 230 may include a memory 440 (e.g., a graphic memory (GRAM)) in which frame data obtained from the display controller 410 is capable of being temporarily stored. The memory 440 may operate as a frame buffer. The display driver IC 230 may generate a data voltage based on the frame data and may supply the generated data voltage to the pixel PX of the display 210. The display driver IC 230 may set each frame as an address frame, a self-refresh frame, or a holding frame based on the control command and may generate a display control signal for driving the display 210. For example, the display driver IC 230 may generate a vertical synchronization signal V-Sync at a set period. Each frame of the display 210 may be divided by the vertical synchronization signal.

During the address frame, the display driver IC 230 may generate a data voltage by obtaining frame data from the display controller 410, and may perform a series of operations of supplying the data voltage to the pixel PX (or a driving transistor included in the pixel PX). During the self-refresh frame, the display driver IC 230 may generate a data voltage based on frame data obtained from the display controller 410 during the previous address frame without obtaining frame data from the display controller 410, and may supply the data voltage to the pixel PX. For example, during the self-refresh frame, the display driver IC 230 may store frame data, which is obtained from the display controller 410 during the previous address frame, in the memory 440 and may supply a data voltage to the pixel PX by generating the data voltage based on the frame data stored in the memory 440. During the holding frame, the display driver IC 230 may hold a data voltage, which is entered into the pixel PX during the previous address frame or self-refresh frame, without supplying the data voltage to the pixel PX. For example, during the holding frame, the display driver IC 230 may supply an emission signal to the pixel PX without supplying the data voltage and may cause the pixel PX to emit light based on the data voltage entered and held during the previous address frame or the self-refresh frame. According to an embodiment, the operation of the display driver IC 230 may be performed by a processor (e.g., the processor 120 of FIG. 1) of the electronic device 400. For example, an operation of the display driver IC 230 may be performed by the display controller 410, and an operation of the display controller 410 may be controlled by the processor 120 of the electronic device 400.

The display controller 410 may obtain frame data and frequency change-based event information (e.g., frame rate information, illuminance information, touch information, wireless charging information, always-on-display (AOD) information, image information, or operation information) from the framework 420. The display controller 410 may deliver the frequency change-based event information to the frequency control module 430. The display controller 410 may obtain frequency information about a refresh frequency, which is set based on the delivered frequency change-based event information, from the frequency control module 430 and may generate a control command based on the obtained frequency information. The display controller 410 may control the operation of the display driver IC 230 by transmitting frame data and the control command to the display driver IC 230.

The framework 420 may include a graphics module 421 (e.g., the graphics manager 321 of FIG. 3), an illuminance module 422, a touch module 423, a wireless charging module 424, an always-on-display (AOD) module 425, an image module 426, and a motion detection module 427. At least one of the modules 421, 422, 423, 424, 425, 426, and 427 of the framework 420 may transmit status information (e.g., frequency change-based event information) to the display controller 410. According to an embodiment, at least one of the modules 421, 422, 423, 424, 425, 426, and 427 of the framework 420 may update the status information, and the display controller 410 may directly identify (or obtain) the status information when necessary or periodically. Alternatively, when the status information is changed or updated by at least one of the modules 421, 422, 423, 424, 425, 426, and 427 of the framework 420, the display controller 410 may identify or obtain the changed status information.

The graphics module 421 may transmit image information, which is to be displayed through the display 210, to the display controller 410. For example, the graphics module 421 may generate frame data by performing rendering, and may deliver the generated frame data and frame rate (frame per second (FPS)) information to the display controller 410. The rendering period or frequency of the graphics module 421 may not be constant. For example, the graphics module 421 may deliver the frame data, which is generated by performing rendering at an irregular period, to the display controller 410. The rendering frequency of the graphics module 421 may be different from an operating frequency of the display 210. Each frame based on the operating frequency of the display 210 may have a specific length of time. When the rendering frequency of the graphics module 421 is less than the operating frequency of the display 210, at least one frame section (hereinafter, also referred to as a "low-frequency driving (LFD) section") in which frame data is not transmitted from the display controller 410 to the display driver IC 230 may be present. During the LFD section, the display 210 may display the same image as an image displayed during a frame immediately before the LFD section. In other words, during two or more frames, the display 210 may display one image corresponding to one frame data.

The illuminance module 422 may obtain illuminance information about external illuminance of the electronic device 400 and may deliver the illuminance information to the display controller 410. The touch module 423 may obtain touch information about whether a user performs a touch operation, by determining whether the user performs the touch operation. The touch module 423 may deliver touch information to the display controller 410. The image module 426 may determine whether an image is updated at a specific period and may deliver an image update frequency to the display controller 410. The AOD module 425 may determine whether an AOD mode is being executed, and may deliver AOD information to the display controller 410. The wireless charging module 424 may determine whether the electronic device 400 is being wirelessly charged, and may deliver wireless charging information to the display controller 410. The motion detection module 427 may detect an operation (e.g., a folding operation or a rolling operation) of the electronic device 400 and may deliver operation information about the detected operation state to the display controller 410. In a case of the electronic device 400 including a foldable display or rollable display, the location or size of a screen display region of the display 210 may change depending on the folding operation or rolling operation of the electronic device 400. When the location or size of the screen display region of the display 210 is changed, the visibility of color difference or brightness difference may change. The frequency control module 430 may calculate a refresh frequency, which is a frequency at which an image is refreshed during the LFD section, by using frequency change-based event information obtained from the display controller 410. A ratio between the self-refresh frame and the holding frame during the LFD section may be determined based on the refresh frequency. For example, when the operating frequency of the display 210 is 120 Hz and a refresh frequency during one section of the LFD section is 30 Hz, one self-refresh frame may be located after three consecutive holding frames. The frequency control module 430 may calculate a target frequency (hereinafter, also referred to as a "first frequency"), which the refresh frequency needs to finally reach during the LFD section, based on frequency change-based event information. The frequency control module 430 may set a refresh frequency such that the refresh frequency becomes small stepwise until the refresh frequency reaches the target frequency during the LFD section. The frequency control module 430 may set a start frequency (hereinafter, also referred to as a "second frequency"), which is a refresh frequency of a section (hereinafter, also referred to as a "start frequency section") in which the LFD section starts, based on the frequency change-based event information. The start frequency may be higher than the target frequency. The number of holding frames consecutive immediately after the address frame may be determined by the start frequency. When the LFD section starts, the display 210 may refresh an image at the start frequency and then may refresh an image at the target frequency. For example, during the LFD section, the target frequency section in which the image is refreshed at the target frequency may be located after a start frequency section in which the image is refreshed at a start frequency. The frequency control module 430 may set an intermediate frequency (hereinafter, also referred to as a "third frequency"), which is lower than the start frequency and is higher than the target frequency, based on the frequency change-based event information. In an embodiment, the refresh frequency of the LFD section may be changed in the order of the start frequency, the intermediate frequency, and the target frequency. According to an embodiment, under the control of the electronic device 400, the refresh frequency during the LFD section may be changed to the target frequency through the start frequency and intermediate frequency, and thus the refresh frequency may be gradually decreased. Accordingly, a brightness difference according to a change of the refresh frequency may be prevented from being visually perceived by a user. According to an embodiment, the intermediate frequency may be omitted. Alternatively, the intermediate frequency may include two or more frequency steps.

Figure 5:
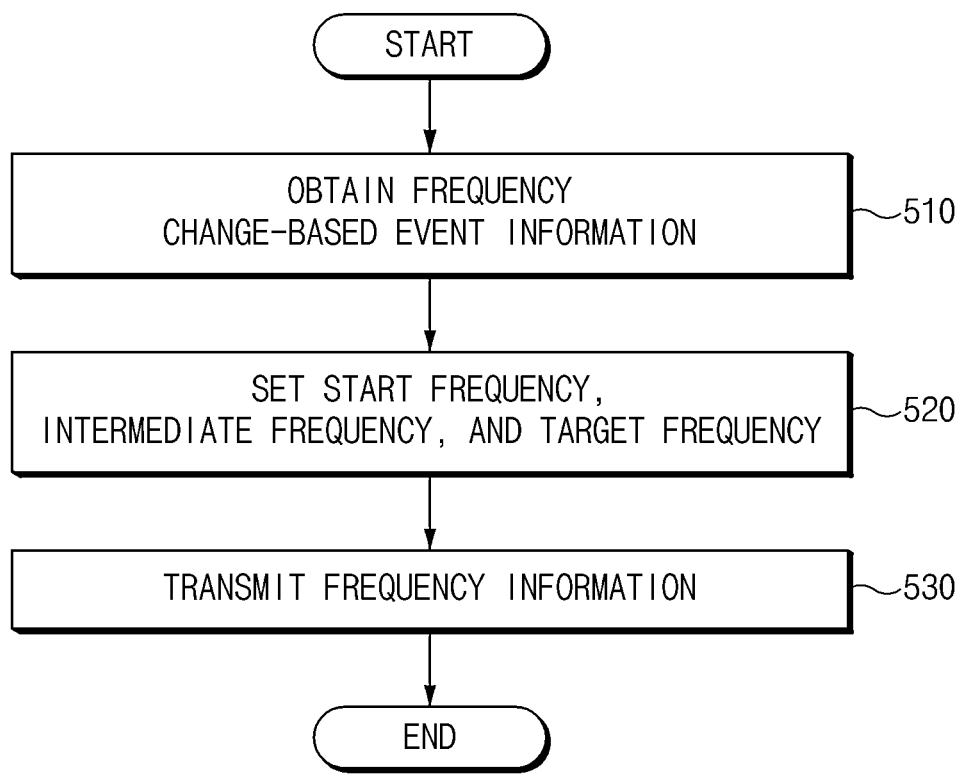
FIG. 5 is a flowchart illustrating an operation of an electronic device, according to an embodiment.

Hereinafter, an operation of an electronic device according to an embodiment will be described with reference to FIG. 5. FIG. 5 is a flowchart illustrating an operation of a frequency control module (e.g., the frequency control module 430 of FIG. 4) included in an electronic device, according to an embodiment.

Referring to FIG. 5, in operation 510, the frequency control module may obtain frequency change-based event information. The frequency change-based event information may include at least one of frame rate information, illuminance information, touch information, wireless charging information, AOD information, image information, and operation information.

In operation 520, the frequency control module may set a start frequency, an intermediate frequency, and a target frequency based on the frequency change-based event information. According to an embodiment, the frequency control module may obtain frame rate (FPS) information from a graphics module (e.g., the display controller 410 of FIG. 4) through a display controller (e.g., the graphics module 421 of FIG. 4). The frequency control module may set a start frequency, an intermediate frequency, and a target frequency based on the frame rate information. For example, the frequency control module may set a frame rate to the target frequency and may set the start frequency and the intermediate frequency to values between an operating frequency of the display and the target frequency. According to an embodiment, the frequency control module may set a limit frequency based on illuminance information, touch information, wireless charging information, AOD information, image information, or operation information, and may set the start frequency, the intermediate frequency, and the target frequency to values having the limit frequency or higher.

In operation 530, the frequency control module may transmit frequency information including the set start frequency, the set intermediate frequency, and the set target frequency to the display controller. The display controller may generate a control command based on the obtained frequency information. The display controller may transmit the generated control command to a display driver IC (e.g., the display driver IC 230 of FIG. 4). The display driver IC may set frames of the LFD section as a self-refresh frame or a holding frame depending on the frequency information set by the frequency control module. According to an embodiment, a processor (e.g., the processor 120 in FIG. 1) or a display controller controlled by the processor may set the frames of the LFD section as a self-refresh frame or a holding frame depending on the frequency information.

Figure 6:
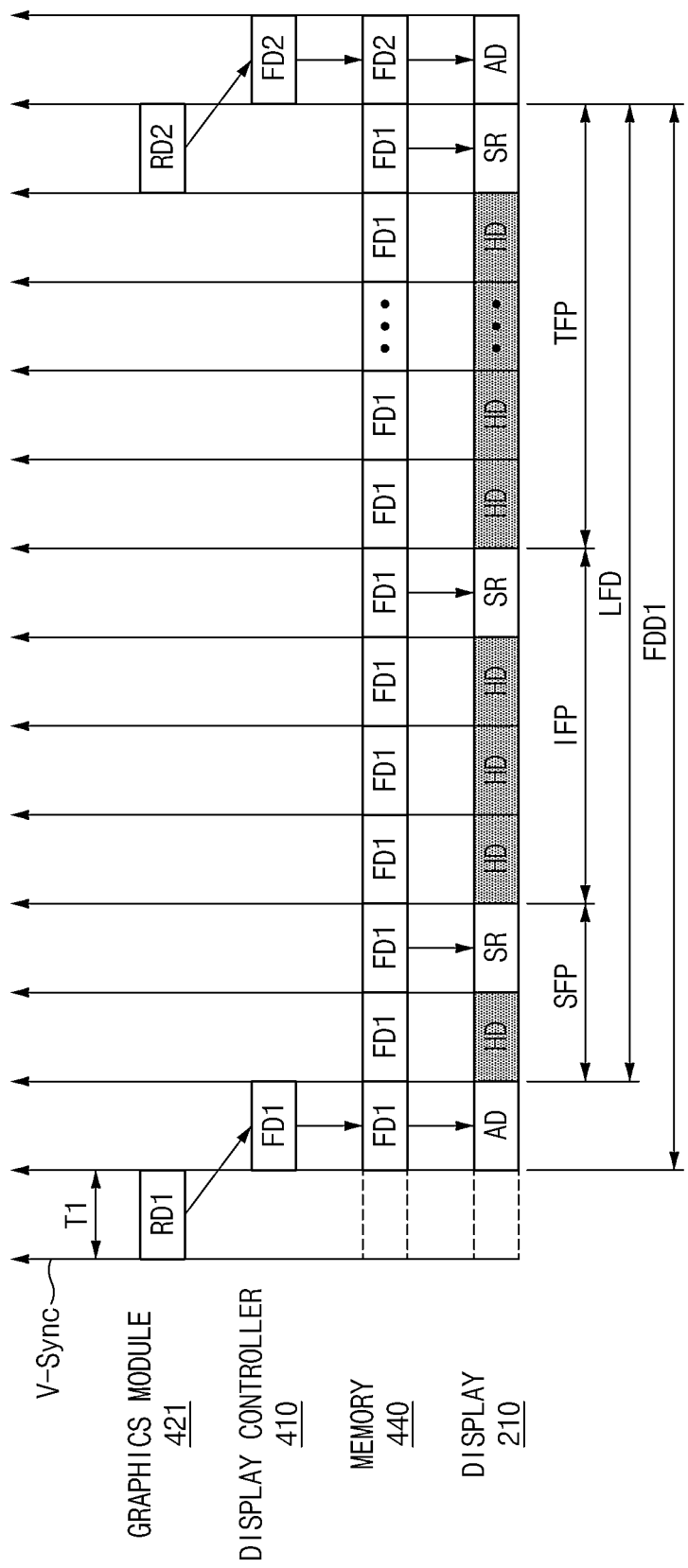
FIG. 6 is a diagram illustrating an operation of displaying a screen by an electronic device, according to an embodiment.

Hereinafter, an operation of an electronic device according to an embodiment will be described with reference to FIG. 6. FIG. 6 is a diagram illustrating an operation of displaying a screen by an electronic device, according to an embodiment.

Referring to FIG. 6, an operating frequency of the display 210 may be constant. In other words, a length T1 of one frame section may be uniformly maintained. During each frame, the display driver IC 230 (see FIG. 4) may generate the vertical synchronization signal V_Sync. Hereinafter, it is assumed that the frame is based on the operating frequency of the display 210. The graphics module 421 may generate first frame data FD1 by performing first rendering RD1, and then may transmit the generated first frame data FD1 to the display controller 410. During the next frame of the frame in which the first rendering RD1 is completed, the display controller 410 may transmit the first frame data FD1 to the display driver IC 230. The display driver IC 230 may store the obtained first frame data FD1 in the memory 440 of the display driver IC 230. The display driver IC 230 may generate a data voltage by using the first frame data FD1 obtained from the display controller 410 and may transmit the data voltage to the display 210.

According to an embodiment, until the previous frame of a next address frame AD, in which a second frame data FD2 is generated by the second rendering RD2 of the graphics module 421 and the second image based on the second frame data FD2 is output, the electronic device may output the first image based on the first frame data FD1. Hereinafter, a frame section in which the first image is output is referred to as a "first image output section FDD1". The first image output section FDD1 may include the address frame AD (hereinafter, also referred to as a "first frame") for the first frame data FD1 and an LFD section LFD. The LFD section LFD may be a frame section in which frame data is not obtained from the display controller 410. For example, the LFD section LFD may be a frame section between the address frame AD for the first frame data FD1 and the address frame AD for the second frame data FD2.

The refresh frequency during the LFD section LFD may be changed in the order of the start frequency, the intermediate frequency, and the target frequency. The LFD section LFD may include a start frequency section SFP (hereinafter, also referred to as a "first section"), an intermediate frequency section IFP (hereinafter, also referred to as a "third section"), and a target frequency section TFP (hereinafter, also referred to as a "second section"). The start frequency section SFP may be a section in which an image is refreshed based on the start frequency. The intermediate frequency section IFP may be a section in which an image is refreshed based on the intermediate frequency. The target frequency section TFP may be a section in which an image is refreshed based on the target frequency. The start frequency may be higher than the intermediate frequency. A ratio of a holding frame HD of the start frequency section SFP may be smaller than a ratio of the holding frame HD of the intermediate frequency section IFP. The intermediate frequency may be higher than the target frequency. A ratio of the holding frame HD of the intermediate frequency section IFP may be smaller than a ratio of the holding frame HD of the target frequency section TFP. For example, when the operating frequency of the display 210 is 120 Hz, the start frequency may be set to 60 Hz, the intermediate frequency may be set to 30 Hz, and the target frequency may be set to 1 Hz. In this case, during the start frequency section SFP, the one holding frame HD and one self-refresh frame SR may be positioned alternately. During the intermediate frequency section IFP of 30 Hz, the one self-refresh frame SR may be located after the three consecutive holding frames HD. During the target frequency section TFP of 1 Hz, the one self-refresh frame SR may be located after the 119 consecutive holding frames HD. The LFD section LFD may include the start frequency section SFP and the intermediate frequency section IFP, and thus the electronic device according to an embodiment may prevent a ratio of the holding frame HD from rapidly increasing. The ratio of the holding frame HD shown in FIG. 6 is an example. For example, the ratio of the holding frame HD may be different from that shown in FIG. 6 according to an embodiment.

Figure 7:
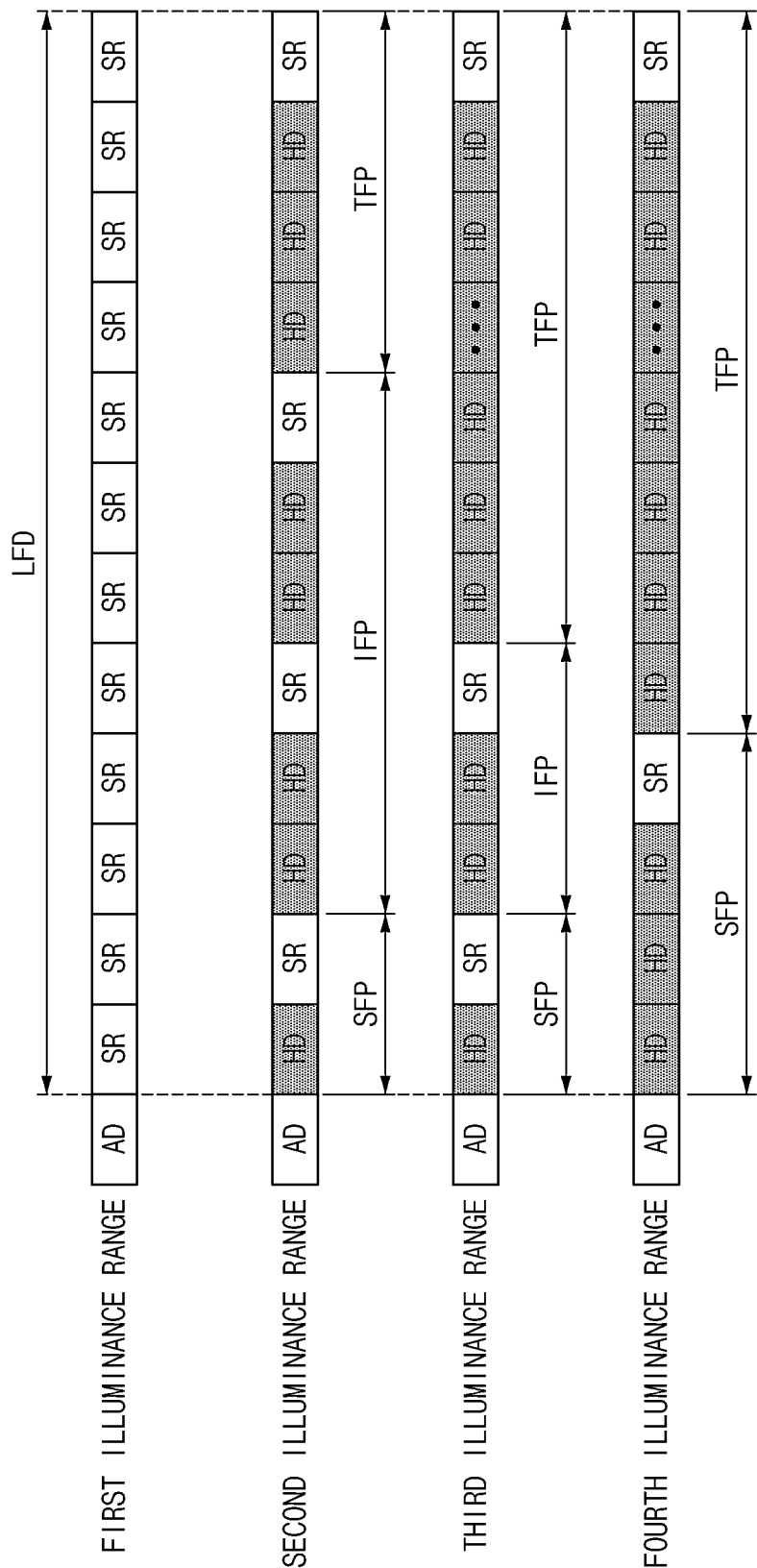
FIG. 7 is a diagram illustrating an operation of an electronic device displaying a screen based on illuminance, according to an embodiment.

Hereinafter, an operation of setting a refresh frequency based on illuminance information will be described with reference to FIG. 7. FIG. 7 is a diagram illustrating an operation of an electronic device displaying a screen based on illuminance, according to an embodiment. Hereinafter, an operation of an electronic device may be referred to as an operation of a processor (e.g., the processor 120 of FIG. 1).

The electronic device (or a frequency control module) according to an embodiment may differently set a refresh frequency of the LFD section LFD depending on illuminance. For example, as the illuminance decreases, the electronic device may set at least one of a start frequency, an intermediate frequency, or a target frequency to be small. As another example, as the illuminance decreases, the electronic device may increase the number of intermediate frequencies. As another example, as the illuminance decreases, the electronic device may increase the holding time of the intermediate frequency. As still another example, the electronic device may set a limit frequency changed depending on an illuminance range and may set each of the start frequency, the intermediate frequency, and the target frequency to a value of the limit frequency or higher. In this case, as the illuminance decreases, the limit frequency may be set to be small.

Referring to FIG. 7, the illuminance may be divided into a first illuminance range (e.g., 40 LUX or lower), a second illuminance range (e.g., more than 40 LUX and 1000 LUX or lower), a third illuminance range (e.g., more than 1000 LUX and 7400 LUX or lower), and a fourth illuminance range (e.g., more than 7400 LUX). As the illuminance decreases, the visibility of color difference or brightness difference may increase.

Because the visibility of color difference or brightness difference is very low in the fourth illuminance range having the largest illuminance, the start frequency and the target frequency may be set to be low, and the target frequency may be reached faster in the fourth illuminance range compared to other illuminance ranges. In the fourth illumination range, the LFD section may include the start frequency section SFP and the target frequency section TFP. For example, when the illuminance has a value within the fourth illuminance range, the LFD section may not include an intermediate frequency section.

In the third illuminance range having an illuminance value smaller than an illuminance value in the fourth illuminance range, the refresh frequency may be set such that the ratio of the holding frame HD in the third illuminance range is smaller than the ratio of the holding frame HD in the fourth illuminance range. In the third illumination range, the LFD section may include the start frequency section SFP, the intermediate frequency section IFP, and the target frequency section TFP. For example, the start frequency of the third illuminance range may be set to be higher than the start frequency of the fourth illuminance range. The target frequency of the third illuminance range may be set to be higher than the target frequency of the fourth illuminance range.

In the second illuminance range having an illuminance value smaller than an illuminance value in the third illuminance range, the refresh frequency may be set such that the ratio of the holding frame HD is smaller than the ratio of the holding frame HD in the third illuminance range. In the second illumination range, the LFD section may include the start frequency section SFP, the intermediate frequency section IFP, and the target frequency section TFP. For example, the target frequency of the second illuminance range may be set to be higher than the target frequency of the third illuminance range. The length of the intermediate frequency section IFP of the second illuminance range may be set to be longer than the length of the intermediate frequency section IFP of the third illuminance range.

The refresh frequency in the first illuminance range having the lowest illuminance may be set such that the ratio of the holding frame HD in the first illuminance range is smaller than the ratio of the holding frame HD in the second illuminance range. In the first illuminance range, the LFD section does not include the start frequency section and the intermediate frequency section, and an image may be refreshed depending on the target frequency immediately after an address frame. For example, the target frequency of the first illuminance range may be set to be higher than the target frequencies of the second illuminance range, the third illuminance range, and the fourth illuminance range.

Figure 8:
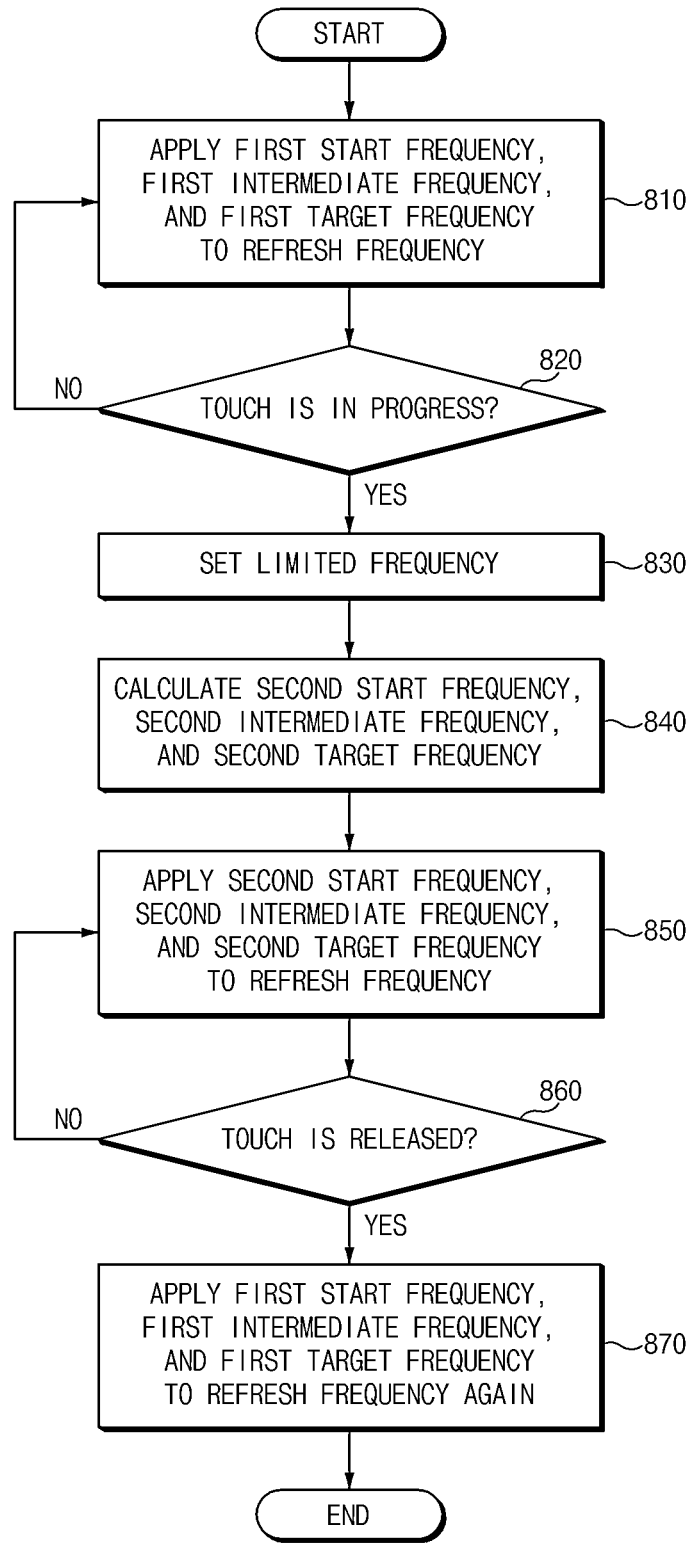
FIG. 8 is a flowchart illustrating an operation of an electronic device, according to an embodiment.

Hereinafter, an operation of setting a refresh frequency based on touch information will be described with reference to FIG. 8. FIG. 8 is a flowchart illustrating an operation of an electronic device, according to an embodiment. Hereinafter, an operation of an electronic device may be referred to as an operation of a processor (e.g., the processor 120 of FIG. 1).

In operation 810, the electronic device may apply a first start frequency, a first intermediate frequency, and a first target frequency to the refresh frequency of an LFD section.

In operation 820, the electronic device may determine whether a user's touch is in progress. For example, a touch module (e.g., the touch module 423 of FIG. 4) may transmit touch information about whether the user performs a touch operation, to a frequency control module (e.g., the frequency control module 430 of FIG. 4). When the user's touch is not in progress, in operation 810, the first start frequency, the first intermediate frequency, and the first target frequency may be applied to the refresh frequency of the LFD section.

When it is determined that the user is performing a touch operation, in operation 830, the electronic device may set a limit frequency by using the frequency control module. According to an embodiment, the frequency control module may set the limit frequency based on the touch information obtained from the touch module. When it is determined that the touch operation is being performed by the user, the limit frequency may be set to ½ of the first target frequency.

In operation 840, the frequency control module of the electronic device may calculate a second start frequency, a second intermediate frequency, and a second target frequency based on the set limit frequency. The second start frequency, the second intermediate frequency, and the second target frequency may be set to have a value of the set limit frequency or higher. When the ratio of holding frame changes rapidly, a potential difference having a specific level or higher may occur in a capacitor of a touch sensor (e.g., the touch sensor 251 in FIG. 2). Moreover, a ghost touch phenomenon in which a touch is detected even though there is no touch may occur. Accordingly, the ghost touch phenomenon may be prevented by setting the limit frequency to a predetermined value, and setting the start frequency, the intermediate frequency, and the target frequency to a value having the limit frequency or higher when the user is performing a touch operation.

In operation 850, the electronic device may apply the calculated second start frequency, the calculated second intermediate frequency, and the calculated second target frequency to the refresh frequency of an LFD section. For example, the frequency control module may transmit frequency information including the calculated second start frequency, the calculated second intermediate frequency, and the calculated second target frequency to a display controller (e.g., the display controller 410). The display controller may allow the display 210 to refresh an image depending on the second start frequency, the second intermediate frequency, and the second target frequency during the LFD section by generating a control command based on the frequency information.

In operation 860, the electronic device may determine whether the user's touch is released. For example, the touch module may transmit the touch information about whether the user performs a touch operation, to the frequency control module. When it is determined that the user's touch is not released, in operation 850, the second start frequency, the second intermediate frequency, and the second target frequency may be applied to the refresh frequency of the LFD section.

When it is determined that the user's touch is released, in operation 870, the electronic device may apply the first start frequency, the first intermediate frequency, and the first target frequency to the refresh frequency of the LFD section again.

Figure 9:
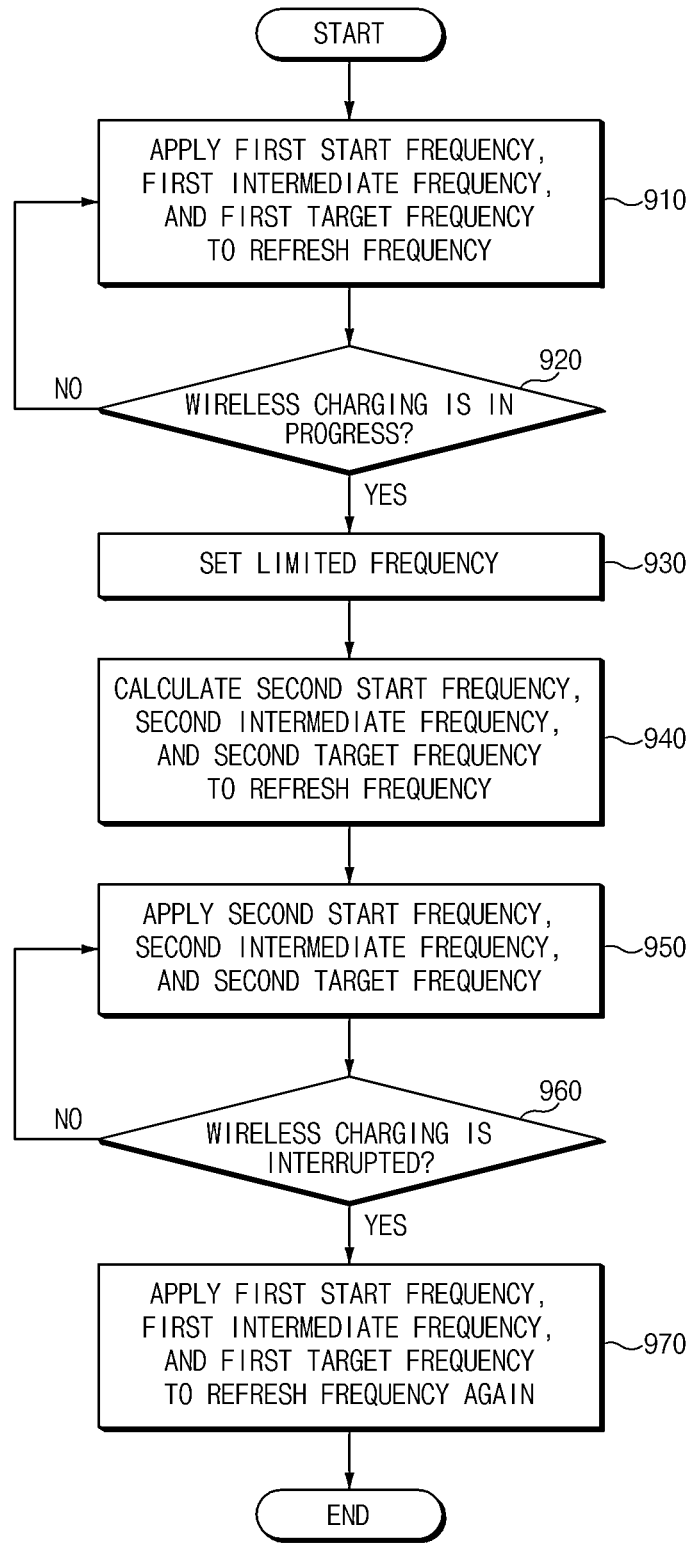
FIG. 9 is a flowchart illustrating an operation of an electronic device, according to an embodiment.

Hereinafter, an operation of setting a refresh frequency based on wireless charging information will be described with reference to FIG. 9. FIG. 9 is a flowchart illustrating an operation of an electronic device, according to an embodiment.

In operation 910, the electronic device may apply a first start frequency, a first intermediate frequency, and a first target frequency to the refresh frequency of an LFD section.

In operation 920, the electronic device may determine whether wireless charging is in progress. For example, a wireless charging module (e.g., the wireless charging module 424 of FIG. 4) may transmit wireless charging information about whether wireless charging is in progress, to a frequency control module (e.g., the frequency control module 430 of FIG. 4). When it is determined that wireless charging is not in progress, in operation 910, the first start frequency, the first intermediate frequency, and the first target frequency may be applied to the refresh frequency of an LFD section.

When it is determined that wireless charging is in progress, in operation 930, the electronic device may set a limit frequency by using the frequency control module. According to an embodiment, the frequency control module may set the limit frequency based on the wireless charging information obtained from the wireless charging module.

In operation 940, the frequency control module of the electronic device may calculate a second start frequency, a second intermediate frequency, and a second target frequency based on the set limit frequency. The second start frequency, the second intermediate frequency, and the second target frequency may be set to have a value of the set limit frequency or higher. When noise due to wireless charging and noise due to a change in a refresh frequency occur at the same time, a potential difference of a specific level or higher may occur in a capacitor of a touch sensor, and a ghost touch phenomenon may occur. Accordingly, the ghost touch phenomenon may be prevented by setting the limit frequency to a predetermined value, and setting the start frequency, the intermediate frequency, and the target frequency to a value having the limit frequency or higher when wireless charging is in progress.

In operation 950, the electronic device may apply the calculated second start frequency, the calculated second intermediate frequency, and the calculated second target frequency to the refresh frequency of an LFD section. For example, the frequency control module may transmit frequency information including the calculated second start frequency, the calculated second intermediate frequency, and the calculated second target frequency to a display controller (e.g., the display controller 410). The display controller may allow the display 210 to refresh an image depending on the second start frequency, the second intermediate frequency, and the second target frequency during the LFD section by generating a control command based on the frequency information.

In operation 960, the electronic device may determine whether wireless charging is interrupted. For example, the wireless charging module may transmit the wireless charging information about whether wireless charging is in progress, to the frequency control module. When it is determined that wireless charging is not interrupted, in operation 950, the second start frequency, the second intermediate frequency, and the second target frequency may be applied to the refresh frequency of the LFD section.

When it is determined that wireless charging is interrupted, in operation 970, the electronic device may apply the first start frequency, the first intermediate frequency, and the first target frequency to the refresh frequency of the LFD section again.

Figure 10:
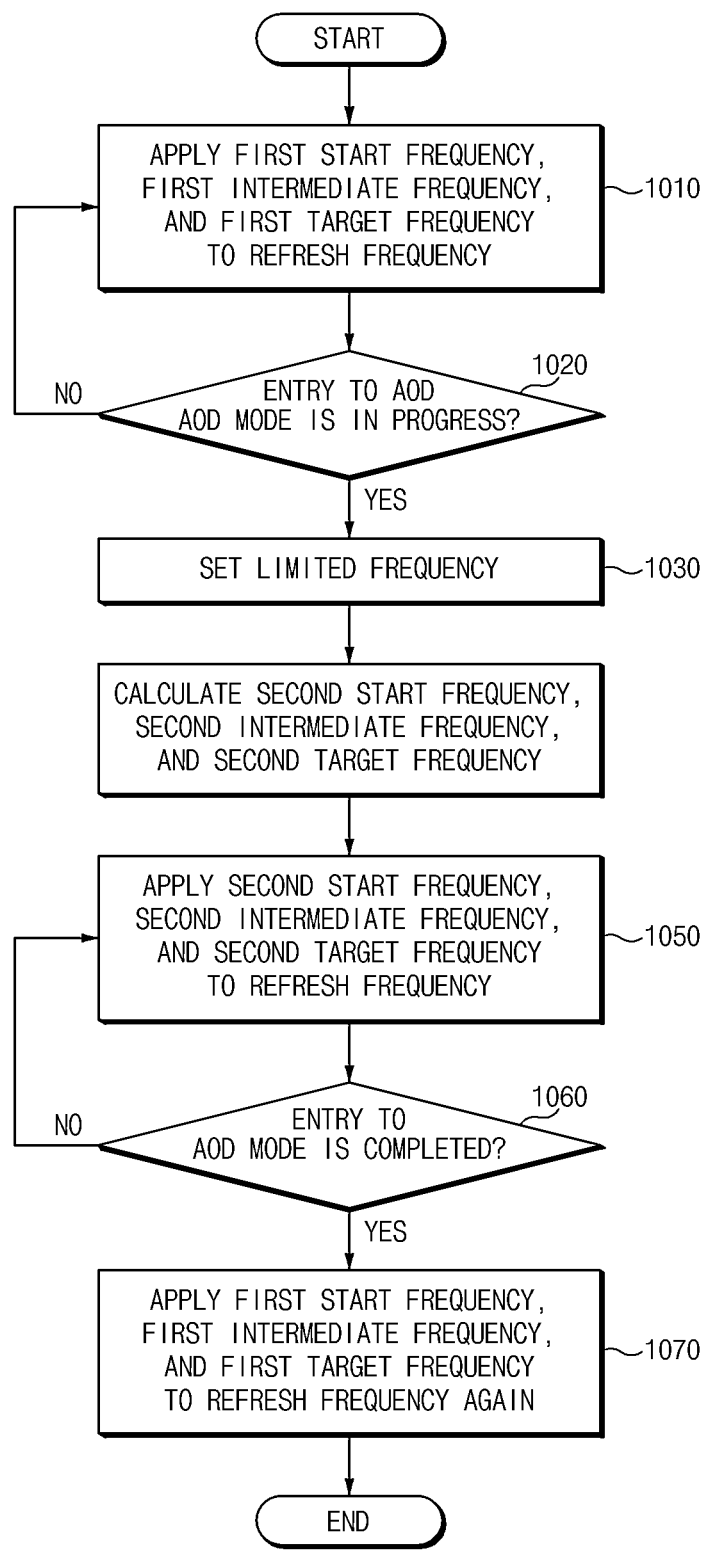
FIG. 10 is a flowchart illustrating an operation of an electronic device, according to an embodiment.

Hereinafter, an operation of setting a refresh frequency based on AOD information will be described with reference to FIG. 10. FIG. 10 is a flowchart illustrating an operation of an electronic device, according to an embodiment.

In operation 1010, the electronic device may apply a first start frequency, a first intermediate frequency, and a first target frequency to the refresh frequency of an LFD section.

In operation 1020, the electronic device may determine whether the electronic device is entering an AOD mode. For example, an AOD module (e.g., the AOD module 425 of FIG. 4) may transmit AOD information about whether the electronic device is entering the AOD mode, to a frequency control module (e.g., the frequency control module 430 of FIG. 4). When it is determined that the electronic device is not entering the AOD mode, in operation 1010, the first start frequency, the first intermediate frequency, and the first target frequency may be applied to the refresh frequency of an LFD section.

When it is determined that the electronic device is entering the AOD mode, in operation 1030, the electronic device may set a limit frequency by using the frequency control module. According to an embodiment, the frequency control module may set the limit frequency based on the AOD information obtained from the AOD module.

In operation 1040, the frequency control module of the electronic device may calculate a second start frequency, a second intermediate frequency, and a second target frequency based on the set limit frequency. The second start frequency, the second intermediate frequency, and the second target frequency may be set to have a value of the set limit frequency or higher. When the electronic device is entering the AOD mode, an operating mode of a touch sensor may be switched to a low power mode, and touch sensitivity may be reset. When a noise level according to a change in a refresh frequency is changed in a process of switching an operating mode of the touch sensor to a low power mode, the calibration of the touch sensitivity may not be performed properly. Accordingly, when the electronic device is entering the AOD mode, the electronic device may set the limit frequency to a predetermined value, and may set the start frequency, the intermediate frequency, and the target frequency to a value having the limit frequency or higher.

In operation 1050, the electronic device may apply the calculated second start frequency, the calculated second intermediate frequency, and the calculated second target frequency to the refresh frequency of an LFD section. For example, the frequency control module may transmit frequency information including the calculated second start frequency, the calculated second intermediate frequency, and the calculated second target frequency to a display controller (e.g., the display controller 410). The display controller may allow the display 210 to refresh an image depending on the second start frequency, the second intermediate frequency, and the second target frequency during the LFD section by generating a control command based on the frequency information.

In operation 1060, the electronic device may determine whether entry to the AOD mode is completed. For example, the AOD module may transmit AOD information about whether the entry to the AOD mode is completed, to the frequency control module. When it is determined that the entry to the AOD mode is not completed, in operation 1050, the second start frequency, the second intermediate frequency, and the second target frequency may be applied to the refresh frequency of the LFD section.

When it is determined that the entry to the AOD mode is completed, in operation 1070, the electronic device may apply the first start frequency, the first intermediate frequency, and the first target frequency to the refresh frequency of the LFD section again.

Figure 11:
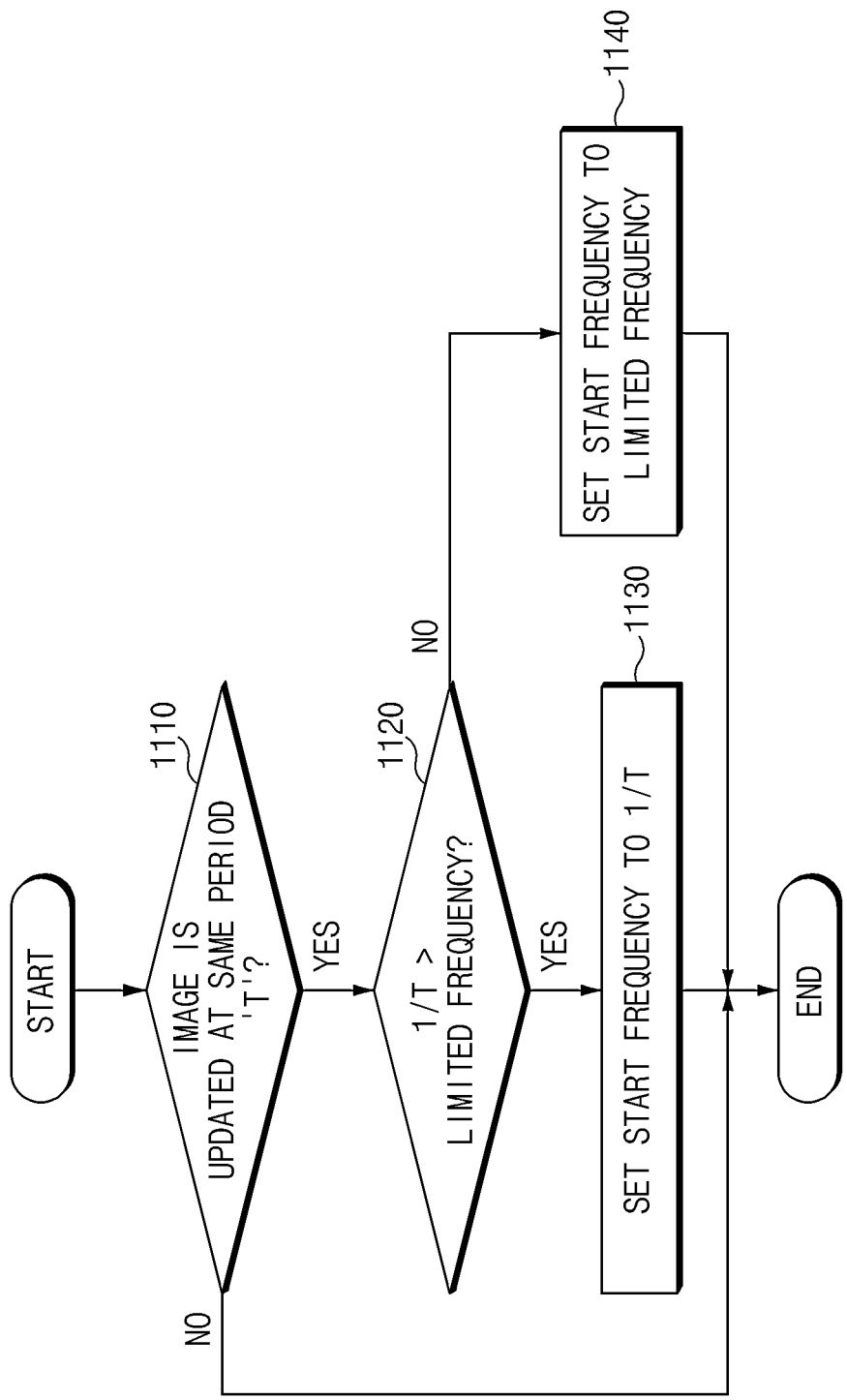
FIG. 11 is a flowchart illustrating an operation of an electronic device, according to an embodiment.
Figure 12:
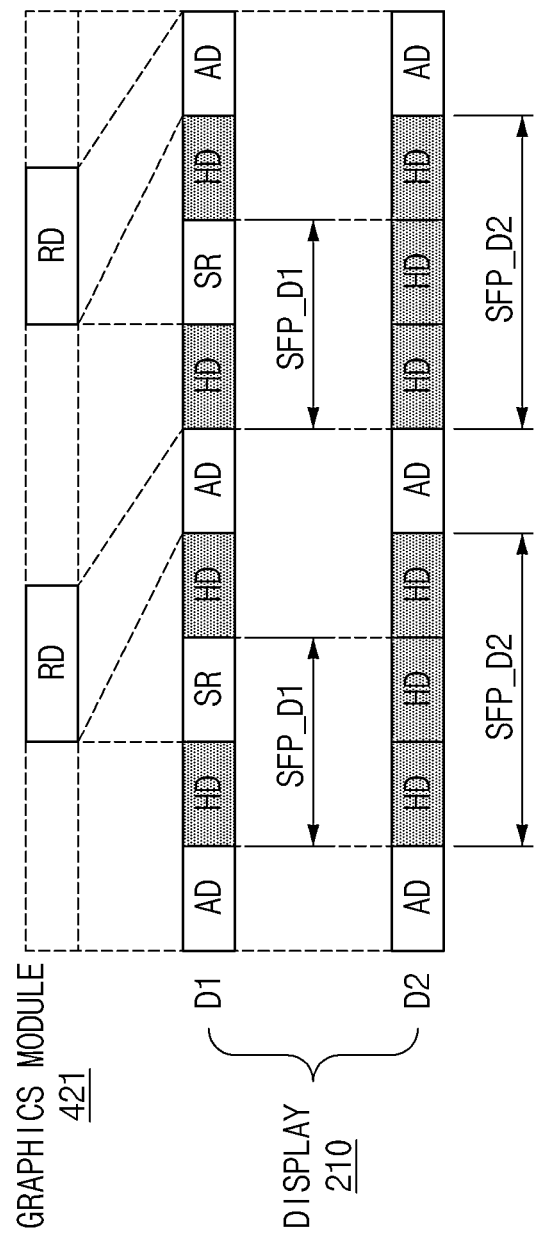
FIG. 12 is a diagram illustrating an operation of an electronic device displaying a screen, according to an embodiment.

Hereinafter, an operation of setting a refresh frequency based on image information will be described with reference to FIGS. 11 and 12. FIG. 11 is a flowchart illustrating an operation of an electronic device, according to an embodiment. FIG. 12 is a diagram illustrating an operation of an electronic device displaying a screen, according to an embodiment.

First of all, referring to FIG. 11, in operation 1110, an electronic device may determine whether an image is updated at the same period 'T'. For example, an image module (e.g., the image module 426 of FIG. 4) may transmit image information about an image updated at a specific period 'T' to a frequency control module (e.g., the frequency control module 430 of FIG. 4).

When it is determined that the image is updated at the same period 'T', in operation 1120, the electronic device may compare an image update frequency '1/T' and a limit frequency. The limit frequency may be a value set as the minimum value of the target frequency.

When the image update frequency '1/T' is greater than the limit frequency, in operation 1130, the electronic device may set the start frequency to the same value as the image update frequency '1/T'.

When the image update frequency '1/T' is not greater than the limit frequency, in operation 1140, the electronic device may set the start frequency to the same value as the limit frequency.

Referring to FIG. 12, in the case of a first electronic device D1 that does not control the start frequency based on image information, the refresh frequency may be changed to the target frequency through the set start frequency and intermediate frequency during an LFD section after the address frame AD. When the image is updated at the specific period 'T', the new image may be updated before the refresh frequency reaches the target frequency and then may be driven during the address frame AD. In this case, a start frequency section SFP_D1 may be continuously repeated and thus the refresh frequency may fail to reach the target frequency.

A second electronic device D2 that controls the start frequency based on the image information may set the start frequency of a start frequency section SFP_D2 to the image update frequency or the limit frequency, thereby efficiently increasing a ratio of the holding frame HD and reducing consumption current.

According to embodiments, an electronic device may reduce a refresh frequency of a display to reduce current consumption used for refresh.

Moreover, according to embodiments, an electronic device may prevent a color difference or a brightness difference according to a change in the refresh frequency from being visually perceived.

Furthermore, according to embodiments, when the refresh frequency is changed, an electronic device may prevent abnormal phenomena (e.g., ghost touch) due to interference with the components of the electronic device from occurring.

According to an embodiment, an electronic device (e.g., the electronic device 101 of FIG. 1) may include a display (e.g., the display 210 of FIG. 4) including a plurality of pixels (e.g., the plurality of pixels PX of FIG. 4) and for displaying a screen, a display driver IC (e.g., the display driver IC 230 of FIG. 4) that delivers a data voltage to the plurality of pixels of the display, and a processor (e.g., the processor 120 of FIG. 1) operatively connected to the display driver IC. The processor may cause a frequency control module (e.g., the frequency control module 430 of FIG. 4) to obtain frequency change-based event information and to calculate a first frequency, which is a target value of a refresh frequency, and a second frequency higher than the first frequency based on the frequency change-based event information. The processor causes a display controller (e.g., the display controller 410 of FIG. 4) to deliver frame data (e.g., the first frame data FD1 of FIG. 6) to the display driver IC. The display driver IC may be configured to set a frame section in which the display is driven, to generate the data voltage based on the frame data obtained from the display controller and to deliver the data voltage to the plurality of pixels during a first frame (e.g., the first frame data FD1 of FIG. 6), and to refresh an image based on the second frequency and then to refresh the image based on the first frequency during a low-frequency driving section (e.g., the low-frequency driving section LFD of FIG. 6), in which the frame data is not obtained, after the first frame.

The display driver IC may be configured to set at least one frame of a first section (e.g., the start frequency section SFP of FIG. 6) within the low-frequency driving section as a self-refresh frame (e.g., the self-refresh frame SR of FIG. 6) based on the second frequency, to set at least one frame of a second section (e.g., the target frequency section TFP of FIG. 6) after the first section as the self-refresh frame based on the first frequency, and to deliver the data voltage to the plurality of pixels during the self-refresh frame. The display driver IC may be configured to maintain the data voltage, which is input during the self-refresh frame or the first frame, during frames (e.g., the holding frame HD of FIG. 6) other than the self-refresh frame of each of the first section and the second section.

The processor may cause the frequency control module to calculate a third frequency, which is the refresh frequency of a third section (e.g., the intermediate frequency section IFP of FIG. 6) located between the first section and the second section, based on the frequency change-based event information. The display driver IC may be configured to set at least one frame within the third section as the self-refresh frame based on the third frequency.

The frequency change-based event information may include illuminance information. The processor may cause the frequency control module to set a length of the third section to increase as an illuminance value decreases.

The frequency change-based event information may include illuminance information. The processor may cause the frequency control module to set at least one of the first frequency or the second frequency to decrease as an illuminance value increases.

The frequency change-based event information may include touch information. The processor may cause the frequency control module to set a limit frequency based on an event that a user is performing a touch operation and to set the first frequency to a value of the limit frequency or higher.

The frequency change-based event information may include wireless charging information. The processor may cause the frequency control module to set a limit frequency based on an event that wireless charging is in progress, and to set the first frequency to a value of the limit frequency or higher.

The frequency change-based event information may include AOD information. The processor may cause the frequency control module to set a limit frequency based on entering an AOD mode and to set the first frequency to a value of the limit frequency or higher.

The frequency change-based event information may include image information. The processor may cause the frequency control module to set a minimum value, which the first frequency is capable of having, to a limit frequency, to compare an image update frequency with the limit frequency based on an event that an image is updated at an identical period, and to set the second frequency to a value identical to the image update frequency when the image update frequency is higher than the limit frequency.

The processor may cause the frequency control module to set the second frequency to a value identical to the limit frequency when the image update frequency is not greater than the limit frequency.

According to an embodiment, an operating method of an electronic device may include calculating a first frequency, which is a target value of a refresh frequency, and a second frequency higher than the first frequency based on frequency change-based event information, setting a frame section in which a display is driven, generating a data voltage based on frame data obtained from a display controller of the electronic device by a display driver IC and delivering the data voltage to a plurality of pixels during a first frame, and refreshing an image based on the second frequency and then refreshing the image based on the first frequency during a low-frequency driving section, in which the frame data is not obtained by the display driver IC, after the first frame.

According to an embodiment, the electronic device may set at least one frame of a first section within the low-frequency driving section as a self-refresh frame based on the second frequency, may set at least one frame of a second section after the first section as the self-refresh frame based on the first frequency, and may deliver the data voltage to the plurality of pixels during the self-refresh frame.

According to an embodiment, the electronic device may maintain the data voltage, which is input during the self-refresh frame or the first frame, during frames other than the self-refresh frame of each of the first section and the second section.

According to an embodiment, the electronic device may calculate a third frequency, which is the refresh frequency of a third section located between the first section and the second section, based on the frequency change-based event information, and may set at least one frame within the third section as the self-refresh frame based on the third frequency.

According to an embodiment, the electronic device may set at least one of the first frequency or the second frequency to decrease as an illuminance value increases.

According to an embodiment, the electronic device may set a limit frequency based on an event that a user is performing a touch operation, and may set the first frequency to a value of the limit frequency or higher.

According to an embodiment, the electronic device may set a limit frequency based on an event that wireless charging is in progress, and may set the first frequency to a value of the limit frequency or higher.

According to an embodiment, the electronic device may set a limit frequency based on entering an AOD mode, and may set the first frequency to a value of the limit frequency or higher.

According to an embodiment, the electronic device may set a minimum value, which the first frequency is capable of having, to a limit frequency, may compare an image update frequency with the limit frequency based on an event that an image is updated at an identical period, and may set the second frequency to a value identical to the image update frequency when the image update frequency is higher than the limit frequency.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
a display comprising a plurality of pixels;
a display driver configured to provide a data voltage to the plurality of pixels of the display; and
a processor configured to:
obtain frequency change-based event information,
determine a first frequency and a second frequency higher than the first frequency based on the frequency change-based event information, the first frequency being a target value of a refresh frequency, and
provide frame data to the display driver,
wherein the processor is further configured to control the display driver to:
set a frame section in which the display is driven,
during a first frame, generate the data voltage based on the frame data and provide the data voltage to the plurality of pixels, and
during a low-frequency driving section in which the frame data is not obtained, after the first frame, refresh an image based on the second frequency in a first section within the low-frequency driving section and refresh the image based on the first frequency in a second section within the low-frequency driving section, the second section being disposed after the first section.

2. The electronic device of claim 1, wherein the processor is further configured to control the display driver to:
set at least one frame of the first section within the low-frequency driving section as a self-refresh frame based on the second frequency,
set at least one frame of the second section after the first section as the self-refresh frame based on the first frequency, and
provide the data voltage to the plurality of pixels during the self-refresh frame.

3. The electronic device of claim 2, wherein the processor is further configured to control the display driver to maintain the data voltage, which is input during the self-refresh frame or the first frame, during frames other than the self-refresh frame of each of the first section and the second section.

4. The electronic device of claim 3, wherein the processor is further configured to:
determine a third frequency, which is the refresh frequency of a third section between the first section and the second section, based on the frequency change-based event information, and
control the display driver to set at least one frame within the third section as the self-refresh frame based on the third frequency.

5. The electronic device of claim 4, wherein the frequency change-based event information comprises illuminance information, and
wherein the processor is further configured to set a length of the third section to increase as an illuminance value decreases.

6. The electronic device of claim 3, wherein the frequency change-based event information includes illuminance information, and
wherein the processor is further configured to set at least one of the first frequency or the second frequency to decrease as an illuminance value increases.

7. The electronic device of claim 3, wherein the frequency change-based event information comprises touch information, and
wherein the processor is further configured to:
set a limit frequency based on an event that a user is performing a touch operation, and
set the first frequency to a value of the limit frequency or higher.

8. The electronic device of claim 3, wherein the frequency change-based event information comprises wireless charging information, and
wherein the processor is further configured to:
set a limit frequency based on an event that wireless charging is in progress, and set the first frequency to a value of the limit frequency or higher.

9. The electronic device of claim 3, wherein the frequency change-based event information comprises always-on-display (AOD) information, and
wherein the processor is further configured to:
set a limit frequency based on entering an AOD mode, and
set the first frequency to a value of the limit frequency or higher.

10. The electronic device of claim 3, wherein the frequency change-based event information comprises image information, and
wherein the processor is further configured to:
set a minimum value, which the first frequency is capable of having, to a limit frequency,
compare an image update frequency with the limit frequency based on an event that an image is updated at an identical period, and
based on the image update frequency being greater than the limit frequency, set the second frequency to a value identical to the image update frequency.

11. The electronic device of claim 10, wherein the processor is further configured to, based on the image update frequency being not greater than the limit frequency, set the second frequency to a value identical to the limit frequency.

12. An operating method of an electronic device, the operating method comprising:
determining a first frequency and a second frequency higher than the first frequency based on frequency change-based event information, the first frequency being a target value of a refresh frequency;
setting a frame section in which a display is driven;
during a first frame, generating, by a display driver of the electronic device, a data voltage based on frame data and providing, by the display driver, the data voltage to a plurality of pixels in the display; and
during a low-frequency driving section in which the frame data is not obtained by the display driver, after the first frame, refreshing an image based on the second frequency in a first section within the low-frequency driving section and refreshing the image based on the first frequency in a second section within the low-frequency driving section, the second section being disposed after the first section.

13. The operating method of claim 12, further comprising:
setting at least one frame of the first section within the low-frequency driving section as a self-refresh frame based on the second frequency;
setting at least one frame of the second section after the first section as the self-refresh frame based on the first frequency; and
providing the data voltage to the plurality of pixels during the self-refresh frame.

14. The operating method of claim 13, further comprising:
maintaining the data voltage, which is input during the self-refresh frame or the first frame, during frames other than the self-refresh frame of each of the first section and the second section.

15. The operating method of claim 14, further comprising:
determining a third frequency, which is the refresh frequency of a third section between the first section and the second section, based on the frequency change-based event information, and
setting at least one frame within the third section as the self-refresh frame based on the third frequency.

16. The operating method of claim 14, further comprising:
setting at least one of the first frequency or the second frequency to decrease as an illuminance value increases.

17. The operating method of claim 14, further comprising:
setting a limit frequency based on an event that a user is performing a touch operation, and
setting the first frequency to a value of the limit frequency or higher.

18. The operating method of claim 14, further comprising:
setting a limit frequency based on an event that wireless charging is in progress; and
setting the first frequency to a value of the limit frequency or higher.

19. The operating method of claim 14, further comprising:
setting a limit frequency based on entering an always-on display (AOD) mode; and
setting the first frequency to a value of the limit frequency or higher.

20. The operating method of claim 14, further comprising:
setting a minimum value, which the first frequency is capable of having, to a limit frequency;
comparing an image update frequency with the limit frequency based on an event that an image is updated at an identical period; and
based on the image update frequency being higher than the limit frequency, setting the second frequency to a value identical to the image update frequency.

* * * * *